May 23, 1967  R. M. TARPLEY  3,321,035
VEHICLE ELECTRONIC SCALES MOUNT
Filed July 23, 1965  2 Sheets-Sheet 1
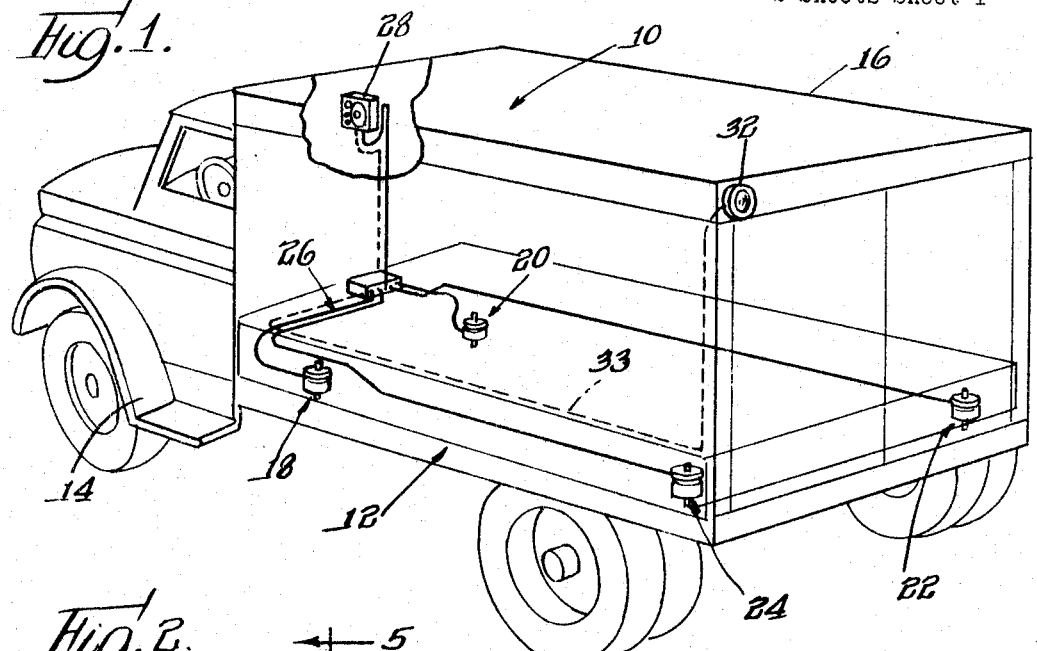
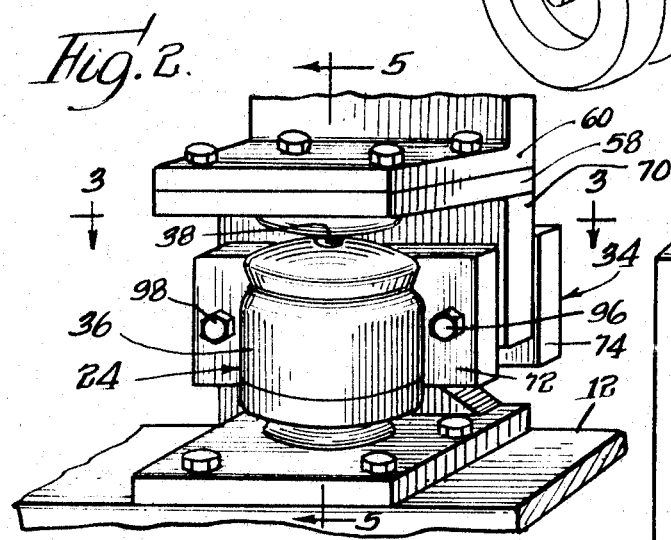
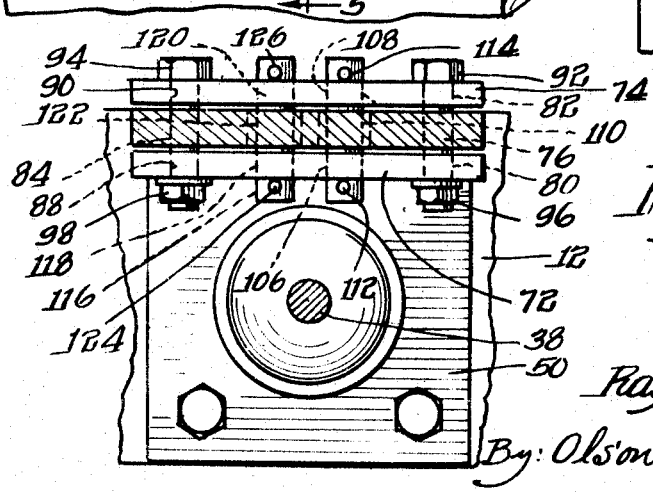
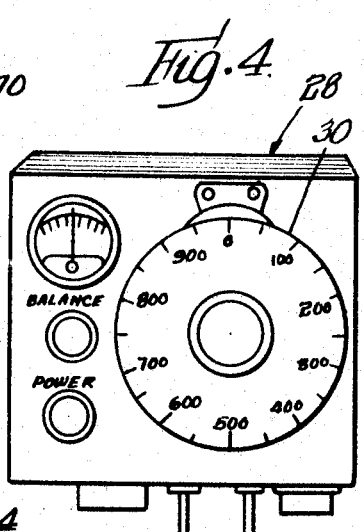
Inventor
Raymond M. Tarpley
By: Olson, Trexler, Wolters & Bushnell
att

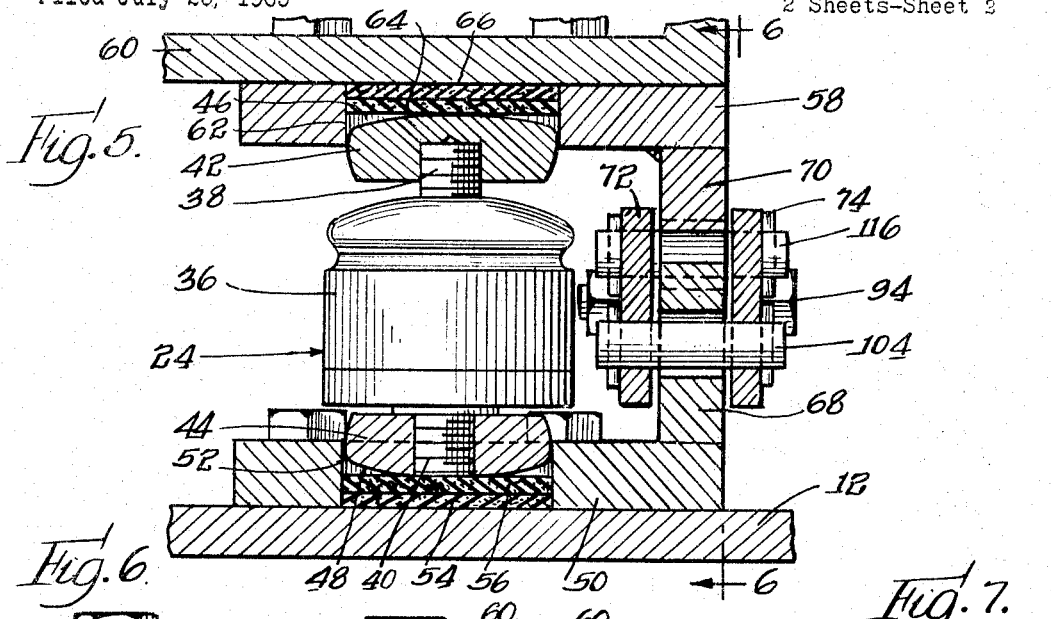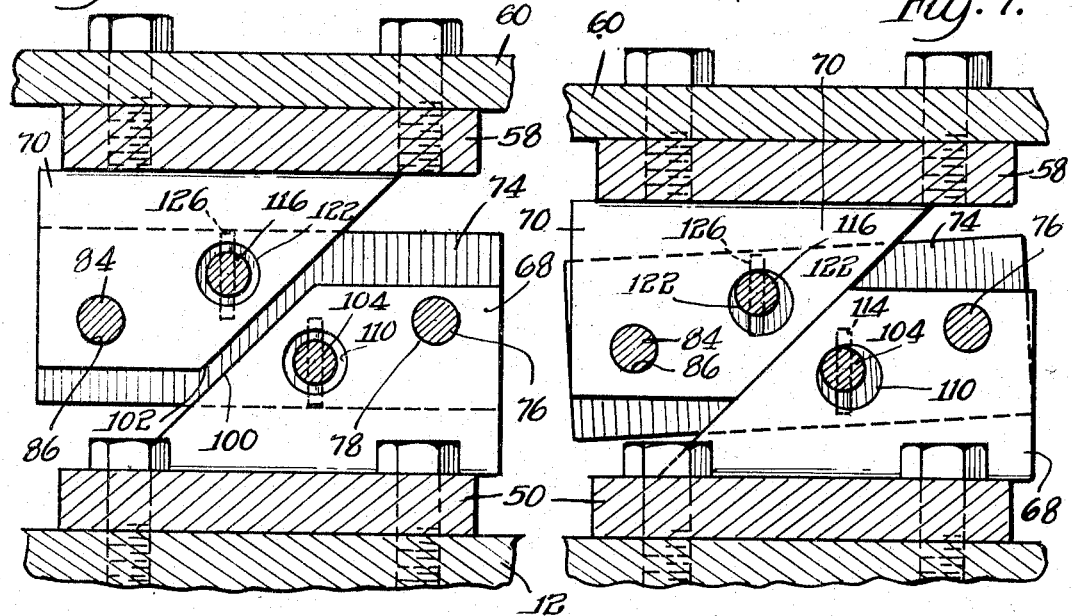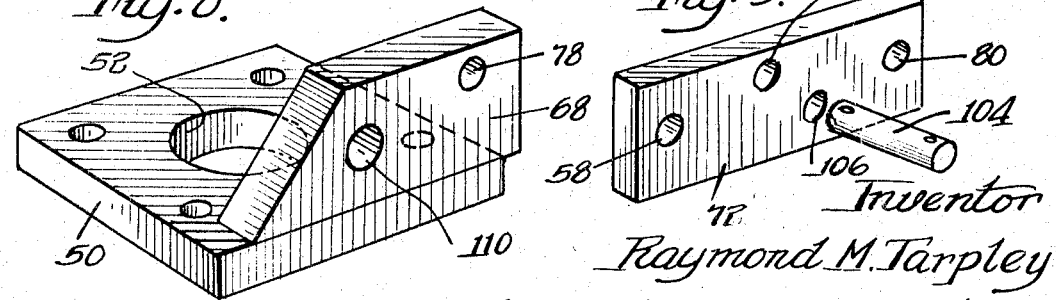

United States Patent Office 3,321,035
Patented May 23, 1967

3,321,035
VEHICLE ELECTRONIC SCALES MOUNT
Raymond M. Tarpley, Garden City, Kans., assignor to Oswalt Industries, Incorporated, Garden City, Kans., a corporation of Kansas
Filed July 23, 1965, Ser. No. 474,365
11 Claims. (Cl. 177—136)

The present invention relates to a mobile novel weighing apparatus, and more specifically to a novel apparatus for weighing a load on a truck or other vehicle.

It has been proposed to mount a box or container on the bed of a truck in a manner such that the contents of the box may be weighed. Various devices including electronic means have been suggested for accomplishing the weighing operation, and problems have been encountered in preventing damage to such devices particularly as a result of shock loads and vibration when the truck is driven from one place to another.

It is an important object of the present invention to provide novel mobile scales wherein a container or box or other member adapted to support a load is mounted on a truck bed or other vehicle in a manner so as to prevent injury to weight sensing means while enabling such means to function efficiently and accurately.

A more specific object of the present invention is to provide a novel mechanism for mounting a load supporting member for limited relative movement with respect to a support structure or vehicle in a manner for minimizing any possibility of injury to weight sensing means or to the mounting mechanism.

Other objects and advantages of the present invention will become apparent from the following description and the accompanying drawings wherein:

FIG. 1 is a partially schematic view showing a vehicle or truck incorporating mobile scales constructed in accordance with features of the present invention;

FIG. 2 is a fragmentary perspective view showing a weight-sensing unit and mechanism for mounting a box or load supporting member on a vehicle or truck bed in accordance with features of the present invention;

FIG. 3 is a sectional view taken generally along line 3—3 in FIG. 2;

FIG. 4 is an elevational view of a weight-indicating unit incorporated in the scale system of FIG. 1;

FIG. 5 is a sectional view taken along line 5—5 in FIG. 2;

FIG. 6 is a sectional view taken along line 6—6 in FIG. 5;

FIG. 7 is a sectional view similar to FIG. 6 but showing the manner in which the parts may move relative to each other;

FIG. 8 is a perspective view showing a portion of the mounting or support mechanism; and FIG. 9 is an exploded perspective view showing additional elements of the mounting or support mechanism.

Referring now more specifically to the drawings wherein like parts are designated by the same numerals throughout the various figures, a weighing apparatus or portable scale 10 incorporating features of the present invention is shown in simplified form in FIG. 1. In this embodiment, the weighing apparatus is mounted on the frame 12 of a truck 14 of known construction. However, it is contemplated that the portable weighing apparatus may be mounted on various known vehicle structures.

The weighing apparatus or portable scale 10 comprises a box or bed structure 16 for containing or supporting a load to be weighed. Electronic load cells, 18, 20, 22 and 24 are mounted between the box 16 and the vehicle frame 12 in a manner described in detail below for supporting the weight of the box and providing an electronic signal in accordance with the load. The electronic load cells are of known commercially available construction and need not be described in detail. The cells are connected by suitable electrical circuit means 26, also of known construction, with an instrument or meter 28 which is mounted at any desired location on the vehicle for easy reading. The meter 28 is of known and commercially available construction and includes a scale 30 actuated in accordance with the signal received from the load cells for providing a visual indication of the total weight of the load within the box 16. If desired, a light, bell or other signal device 32 may be connected by wire 33 with the meter 28 for providing a visual or audible signal when the weight of the load in box 16 reaches a predetermined figure. For example, the meter 28 could be adjusted so that the signal device 32 would be actuated when the load in the box 16 reaches a predetermined maximum figure so that an operator may easily observe when the desired amount of material has been introduced into the box during a loading operation.

In accordance with a feature of the present invention, a hinge or mounting assembly 34 is disposed in association with each of the electronic load cells and between the bed or box 16 and the vehicle frame 12. All of the hinge or mounting assemblies are substantially identical so that only the assembly disposed in association with the load cell 24 is shown and described in detail. The hinge or mounting assemblies 34 are constructed so as to minimize or eliminate shock and thrust loads on the load cells and to maintain the bed or box structure 16 in proper position on the vehicle frame during movement of the vehicle from one location to another or during loading or unloading of the box.

While, as indicated above, the load cell 24 is of known commercially available construction and need not be described in detail, it may be observed that the cell comprises an upright body 36 having studs 38 and 40 respectively extending upwardly and downwardly therefrom. Disc like head elements or knobs 42 and 44 are respectively picked up from the studs 38 and 40 and present axially oppositely facing rounded or convex surfaces 46 and 48.

The hinge or mounting assembly has a base plate 50 adapted to be secured by bolts or other suitable fastening means to the vehicle frame 12. A pocket 52 is formed in the base plate having a diameter similar to the outside diameter of the fitting or knob element 44 and the knob element is adapted to seat within the pocket as shown best in FIG. 5. The bottom of the pocket 52 is provided by one or more layers 54 and 56 of rubber or other suitable tough, resilient shock-absorbing material.

The hinge or mounting assembly includes a top plate 58 substantially identical to and oppositely disposed from the base plate 50. The plate 58 is adapted to be mounted to a lower portion of the bed or box structure 16 by any suitable means, which in the embodiment shown, comprises a bracket 60. The plate 58 is formed with a pocket 62 for receiving the upper fitting or knob element 42. Additional rubber or tough resilient shock-absorbing elements 64 and 66 define the upper end of the pocket 62 against which the rounded surface 46 of the knob element 42 abuts.

With the structure thus far described, it is seen that the weight of the bed or box structure 16 is supported from the frame of the vehicle by the electronic load cells and the downward thrust of the load on the bed or box structure 16 is transmitted through the shock-absorbing pads 64 and 66, the knob or fitting 42, the stud 38, the body of the load cell, the stud 40, the lower knob or fitting 44 and the lower shock-absorbing pads 54 and 56. Thus the weight on the bed or box 16 may be accurately sensed while at the same time generally downwardly or vertically directed shock loads are adapted to be absorbed for minimizing any possibility of injury to the load cell.

In order to enable the load cell to function, it is of course necessary that the upper stud 38 and portions of the cell attached thereto move downwardly in response to the weight of the load being measured and this necessitates downward movement of the bed or box structure 16 relative to the frame 12 of the vehicle. The mounting or hinge structure is adapted to permit such downward movement of the bed or box 16 while at the same time retaining the box in proper position on the vehicle frame and preventing either laterally or forwardly or reversely directed thrusts from being imposed on the load cells.

The mounting or hinge structure 34 comprises oppositely disposed elements 68 and 70 respectively welded or otherwise secured to and extending upwardly and downwardly from the plates 50 and 58. Hinge links 72 and 74 closely embrace opposite sides of and extend between the lugs or elements 68 and 70. A first pivot pin 76 extends through an aperture 78 in the upstanding lug or element 68 and aligned apertures 80 and 82 in the links 72 and 74. A second pivot pin 84 extends through an aperture 86 in the depending lug or element 70 and through aligned apertures 88 and 90 in ends of the links 72 and 74 opposite from the pivot pin 76. The pivot pins 76 and 84 may be in the form of bolts respectively having heads 92 and 94 on first ends thereof and adapted to receive nuts or other securing devices 96 and 98 on opposite ends thereof.

The pivotal connection between the links and the lugs 68 and 70 permit the parts to pivot relative to each other between the position shown in FIG. 6 and the position shown in FIG. 7 when the bed 16 is forced downwardly by a load thereon. At the same time the links which closely embrace opposite sides of the lugs 68 and 70 prevent the bed 16 from shifting laterally or in the direction of the axes of the pivot pins 76 and 84 relative to the frame of the vehicle.

The lugs 68 and 70 are formed with opposing abutment surfaces 100 and 102 which are normally spaced apart as shown in FIG. 6. However, when the bed 16 is forced downwardly either as a result of static loads or shock loads, the abutment surfaces 100 and 102 are adapted to engage each other as shown in FIG. 7 for positively limiting further downward movement of the bed 16 and thereby positively limiting further downward movement of the stud 38 of the electronic load cells for preventing overloading and injury to the cells.

It will be appreciated that when the truck 14 is driven from one location to another, there may be a tendency for the bed or box structure 16 to lift or bounce upwardly from the vehicle frame 12 in the event the vehicle passes over a bump or rough terrain. The mounting or hinge assembly 34 is constructed for positively limiting relative movement of the box structure 16 upwardly with respect to the frame 12. As shown in the drawings, a stop element or pin 104 extends through aligned apertures 106 and 108 in the link elements 72 and 74 and an aligned aperture 110 in the upstanding lug or element 68. Cotter pins or other fastening elements 112 and 114 are inserted through opposite ends of the stop pin 104 for retaining the stop pin in assembled relationship. Another similar stop pin 116 extends through aligned apertures 118 and 120 in the links and aperture 122 in the depending lug or element 70. The stop pin 116 is also retained in assembled relationship by cotter pins or other fastening elements 124 and 126.

The stop pins fit snugly within their associated apertures in the link members. However, the apertures 110 and 122 in the lugs 68 and 70 have diameters substantially greater than the diameters of the pins. The size of the apertures 110 and 122 is such as to permit the desired pivotal movement of the hinge structure as shown in FIG. 7. At the same time, the margins of the apertures 110 and 122 provide abutment surfaces engageable with the stop pins 104 and 116 for limiting the pivotal movement and particularly for limiting relative movement of a lug 70 and thus the box structure 16 upwardly away from the lug 68 and thus the vehicle frame.

As previously indicated, the plate 50 is fixed to the vehicle frame and thus the lug 68 is fixed and the axis of the pivot pin 76 is fixed. As a result, pivotal movement of the pin structure as shown from the position in FIG. 6 to the position shown in FIG. 7 causes the lug 78 and the box structure 16 to shift not only downwardly but also slightly longitudinally relative to the plate 50 and the vehicle frame. This action also causes the upper end of the load cell retained in the pocket 62 to shift slightly relative to the lower end of the load cell which is retained in the fixed pocket 52. In other words, the load cell becomes slightly tilted relative to the plates 50 and 58. During such tilting movement of the load cell, the rounded surfaces 46 and 48 on the fittings 42 and 44 roll slightly over the bottom surfaces of the pockets so as to minimize or eliminate any application of bending thrusts to the load cell.

While a preferred embodiment of the present invention has been shown and described herein, it is obvious that many structural details may be changed without departing from the spirit and scope of the appended claims.

The invention is claimed as follows:

1. A mobile scale of the type described comprising mobile frame means, a load supporting structure above said frame means, a weight-sensing device between said frame means and said structure, and mounting means connecting said structure and said frame means for limited relative up and down movement, said mounting means comprising upper and lower pocket means respectively associated with said structure and said frame means, said sensing device having upper and lower ends respectively retained by said upper and lower pocket means, depending and upstanding elements respectively fixed with respect to said upper and lower pocket means, link means extending between and along sides of said elements, and pivot means connecting opposite end portions of said link means respectively with said depending and upstanding elements.

2. A mobile scale, as defined in claim 1, wherein said frame means comprises a self-propelled vehicle.

3. A mobile scale, as defined in claim 1, wherein said link means comprises a pair of link members embracing opposite sides of said depending and upstanding elements.

4. A mobile scale, as defined in claim 1, which includes cooperable abutment means between said elements and said link means for positively limiting relative up and down movement between said frame means and said supporting structure.

5. A mobile scale, as defined in claim 1, which includes head elements on upper and lower ends of said weight-sensing device and respectively fitting within said upper and lower pocket means, said head elements having mounted surfaces for permitting tilting movement of the weight-sensing device relative to said pocket means.

6. In a mobile scale of a type having a base, a load supported structure over said base and a weight-sensing device between said base and said structure, an assembly for connecting said support structure for limited movement relative to said base and for retaining said load-sensing device, said assembly including upper and lower members respectively having means cooperable with upper and lower ends of said device for retaining said device, upper and lower elements respectively fixed with respect to said upper and lower members, link means extending between and alongside of said elements, and pivot means respectively connecting opposite ends of said link means with said upper and lower elements.

7. An assembly, as defined in claim 6, wherein said upper and lower elements comprise opposed diagonally extending abutment surfaces engageable with each other for positively limiting movement of said upper and lower members toward each other.

8. An assembly, as defined in claim 6, which includes stop pin means extending into generally aligned apertures in said link means and one of said elements, one of said apertures having transverse dimensions greater than said pin means and providing an abutment surface engageable with said pin means for positively limiting relative movement of said upper and lower members away from each other.

9. An assembly, as defined in claim 6, wherein said link means comprises a pair of link members embracing opposite sides of said elements.

10. An assembly, as defined in claim 6, wherein said means of said upper and lower members cooperable with the weight-sensing device comprise pockets for receiving end portions of said device and permitting relative pivotal movement between said device and said members.

11. An assembly, as defined in claim 10, which includes resilient shock-absorbing means defining bottoms of said pockets and engageable with opposite ends of said device.

References Cited by the Examiner
UNITED STATES PATENTS

| | | | |
|---|---|---|---|
| 3,123,166 | 3/1964 | Schellentrager | 177—132 X |
| 3,199,619 | 8/1965 | Hathaway | 177—136 |

RICHARD B. WILKINSON, *Primary Examiner.*

G. H. MILLER, *Assistant Examiner.*